US012578053B1

(12) United States Patent (10) Patent No.: US 12,578,053 B1

Uncapher (45) Date of Patent: Mar. 17, 2026

(54) STAND FOR CONCEALING A PERSON AND SUPPORTING A TARGET APPARATUS

(71) Applicant: James Patrick Uncapher, Beaumont, TX (US)

(72) Inventor: James Patrick Uncapher, Beaumont, TX (US)

( * ) Notice: Subject to any disclaimer, the term of this patent is extended or adjusted under 35 U.S.C. 154(b) by 0 days.

(21) Appl. No.: 18/797,213

(22) Filed: Aug. 7, 2024

(51) Int. Cl.
| | |
|---|---|
| *F16M 11/22* | (2006.01) |
| *A01M 31/02* | (2006.01) |
| *F16M 11/04* | (2006.01) |
| *F41A 23/04* | (2006.01) |

(52) U.S. Cl.
CPC .......... F16M 11/22 (2013.01); A01M 31/025 (2013.01); F16M 11/041 (2013.01); F41A 23/04 (2013.01)

(58) Field of Classification Search
CPC ......... F41A 23/04; F41A 23/24; F16M 11/22; F16M 11/041; A01M 31/025
See application file for complete search history.

(56) References Cited

U.S. PATENT DOCUMENTS

| | | | | |
|---|---|---|---|---|
| 2,164,722 | A * | 7/1939 | Sanders ................... | B64D 7/02 |
| | | | | 89/37.16 |
| 4,782,616 | A * | 11/1988 | Hambleton ......... | A01M 31/025 |
| | | | | D25/16 |
| 9,033,105 | B1 * | 5/2015 | Boswell ................ | A01M 31/02 |
| | | | | 182/115 |
| 2014/0020726 | A1 * | 1/2014 | Nolz ....................... | F41A 23/14 |
| | | | | 135/144 |
| 2016/0021869 | A1 * | 1/2016 | George ................... | A47C 3/18 |
| | | | | 135/96 |
| 2018/0064096 | A1 * | 3/2018 | Kruska ................ | F16M 11/242 |
| 2024/0381866 | A1 * | 11/2024 | Carnley ................. | F41A 23/14 |

* cited by examiner

*Primary Examiner* — Michael McCullough
(74) *Attorney, Agent, or Firm* — Edward B. Marvin; Jackson Walker LLP

(57) ABSTRACT

Herein disclosed is a stand that supports a targeting apparatus for targeting an object and conceals a user of the targeting apparatus from the targeted object. An elongated member has a first end that contacts a ground surface and a second end opposite the first end that has a targeting apparatus rest. A shielding screen is mounted on the elongated member. The shielding screen has an opening through which the user can view the targeted object. The opening is positioned such that a line of sight from the targeting apparatus extends through the opening while the targeting apparatus is placed on the targeting apparatus rest. In some embodiments, the shielding screen is collapsible for easy transport to a desired location for targeting activities and the shield can be deployed once at the desired location.

26 Claims, 10 Drawing Sheets

STAND FOR CONCEALING A PERSON AND SUPPORTING A TARGET APPARATUS

BACKGROUND

1. Field of the Invention

The present invention relates to a stand that supports a targeting apparatus and conceals a person while targeting an object such as, for example, during hunting, photography, or wildlife viewing/observation. More specifically, the invention concerns a stand that both supports the targeting apparatus and conceals the person from the targeted object.

2. Description of the Related Art

Targeting activities include those activities where someone uses a targeting apparatus (e.g., a firearm, camera, telescope, laser, range finder, binoculars, etc.) to target an object. In general, the purpose of the targeting activity is to observe the targeted object, stalk the targeted object, shoot the targeted object for sport, or capture the targeted object on film.

Support stands for targeting apparatuses are well known in the art. In hunting, rifle rests have long been known. For example, U.S. Pat. No. 1,890,423 to Teagarden, issued in 1932. More recently, such rifle rests have been described as "shooting sticks," many of which offer the traditional U-shaped or V-shaped cradles to rest a firearm. Shooting sticks are also available with advanced quick-release systems to connect attachments at the end of the stick distal to the ground surface. These attachments may include a traditional cradle or other features to interface with a firearm placed on the shooting stick. Additionally, shooting sticks are commonly available in a monopod configuration with a single leg, but may also be offered as a bipod, a tripod, or other configuration.

Support stands for cameras and the like are also well-known. Traditionally, these support stands are configured as tripods but, similar to shooting sticks, are offered in other configurations. Additionally, camera applications typically have a quick release adapter plate attached to the camera or its lens. The plate (or a protrusion thereon) fits into a receiver that is attached at the end of the stand distal to the ground surface. Such quick-release systems allow the camera to be quickly disconnected from and reconnected to the support stand.

Many existing targeting apparatus support stands also incorporate a pivot connection between the targeting apparatus and the stand. In this regard, the targeting apparatus can rest on the stand as intended, and the pivot connection enables the targeting apparatus to be pivoted in one or more directions so that the targeting apparatus can follow movement of the targeted object. Such pivot connections may be offered as a unilateral pivot joint for movement of the targeting apparatus in a single plane, or as multilateral pivot joint such as, for example, a ball and socket joint, which allows movement of the targeting apparatus in multiple planes.

While useful, currently available targeting apparatus support stands are singularly focused on providing a stable rest for the targeting apparatus, and fail to account for other challenges encountered during the targeting activity. In general, such challenges depend on the purpose of the activity and the nature of the targeted object. For example, oftentimes the targeted object is wildlife that must be tracked or stalked but is easily spooked or scared away if the wildlife sees movement.

Accordingly, there is a need for a device that allows a person to conceal their movement while stalking the targeted object and that provides support to steady the targeting apparatus.

BRIEF SUMMARY

The present invention provides an apparatus both for concealing the movement of a person stalking a targeted object and for supporting a targeting apparatus when observing the targeted object, shooting the targeted object for sport, or capturing the targeted object on film. In the preferred embodiment, it generally comprises an elongated member with a first end for placement on a ground surface and a second end opposite the first end.

A targeting apparatus rest is at the second end. Together, the elongated member and the targeting apparatus rest allow the weight of the targeting apparatus to be transferred to the ground surface or whatever surface on which the present invention is deployed for use.

The targeting apparatus rest is configured such that a firearm, camera, telescope, range finder, or other targeting apparatus may be placed on it. The rest may be configured so that there are two points of contact between the targeting apparatus such as, for example, in the traditional U-shaped or V-shaped cradle rifle rests, or the rest may have a more advanced configuration with a quick-release adapter. Additionally, a pivot connection or ball-and-socket adapter may be between the rest and the elongated member, thereby allowing the targeting apparatus to have a range of movement without removing it from the rest.

Alternatively, the present invention may be deployed for use on a pre-existing support stand or shooting stick. In such case, the first end of the present invention is configured to connect with the pre-existing support stand through a quick release adapter or other suitable attachment on the distal end of the pre-existing support stand. As such, a pre-existing shooting stick or pre-existing tripod, for example, may be retrofitted with the present invention to enable concealment of the user.

The invention includes a screen mounted on the elongated member. Preferably, the screen is attached to a ring that extends around the elongated member, as further described below. The screen has an opening generally aligned with the targeting apparatus rest such that when the targeting apparatus is placed on the rest, a line of sight extends from the targeting apparatus through the opening to the targeted object. As such, a user located on aback, or user-facing, side of the screen can view with the targeting apparatus a targeted object positioned in front of the screen. The screen is preferably made from a diffuse camouflage material or other non-transparent material, so that the user is concealed from the targeted object.

One or more curtains may also be present to help further conceal the user from the targeted object. Such curtains may extend, for example, from a bottom edge of the screen in a direction toward the ground surface.

The invention also may be designed for easy, compact transport. For example, the screen preferably is collapsable to a position along the elongated member. Additionally, when present, the curtains may be wrapped around the elongated member to hold the screen and other features securely in place during transport.

DETAILED DESCRIPTION

Figure 1:
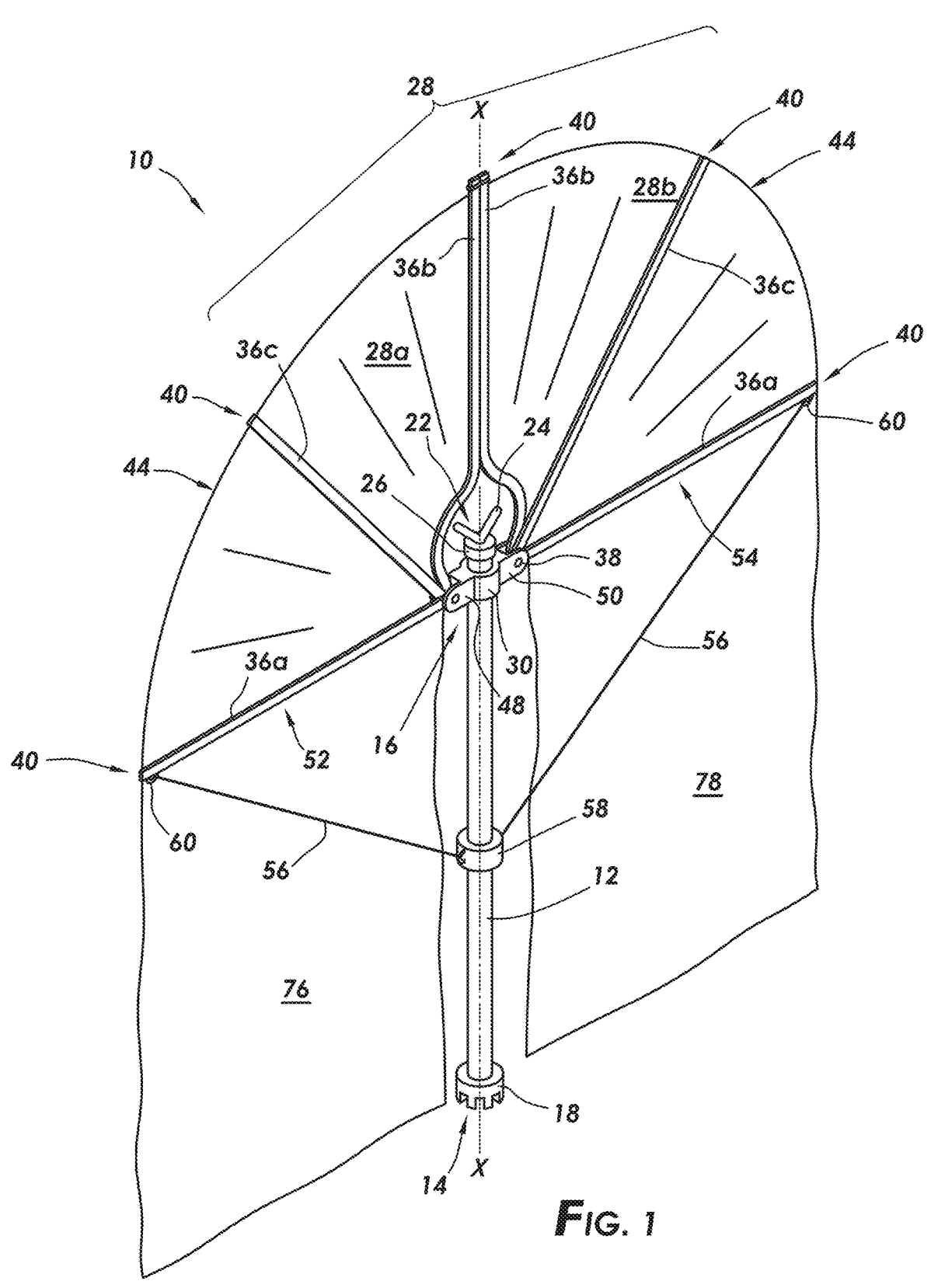
FIG. 1 shows a rear perspective view of an embodiment of the present invention.
Figure 2:
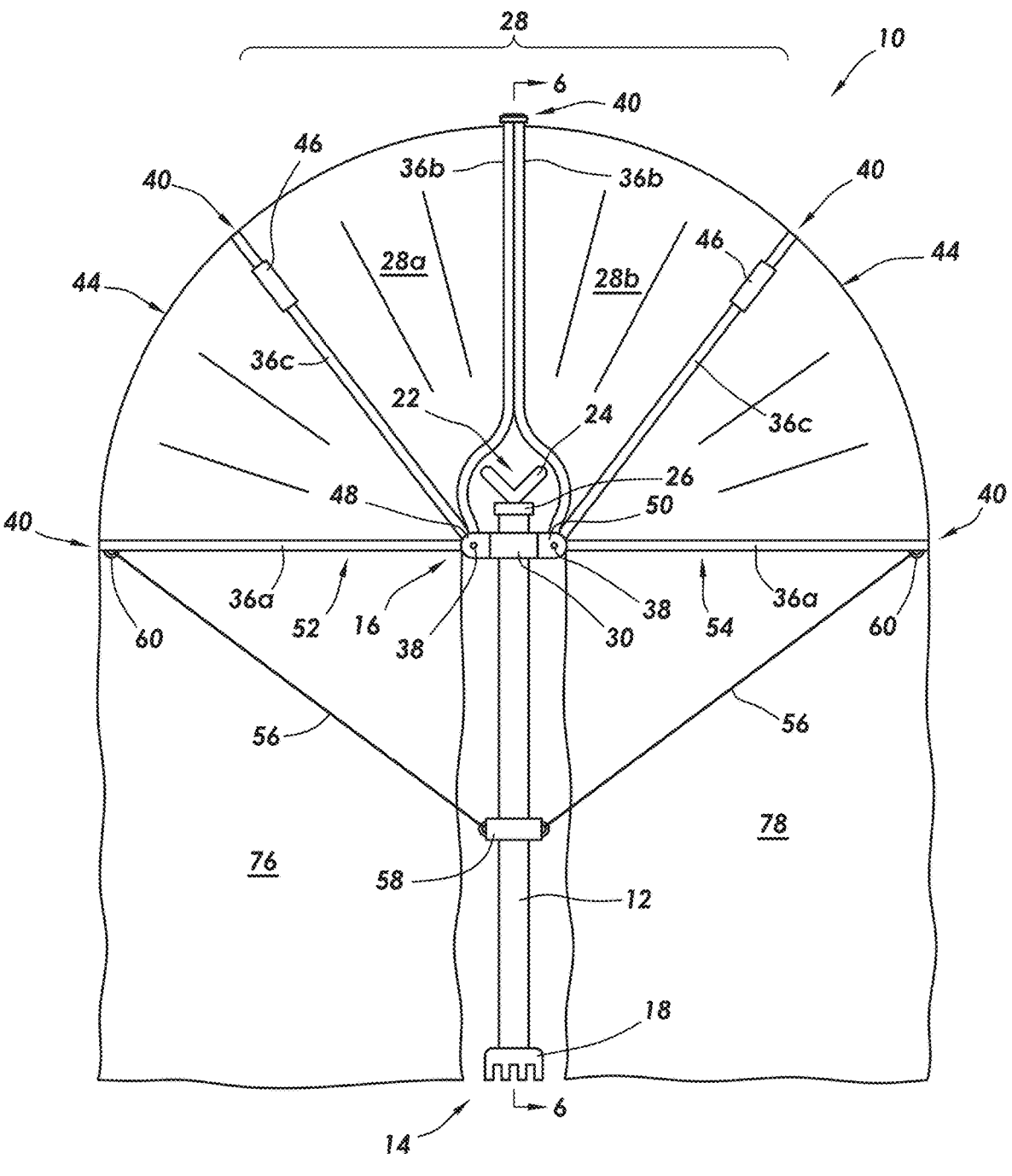
FIG. 2 shows a rear elevation view of the embodiment in FIG. 1.
Figure 3:
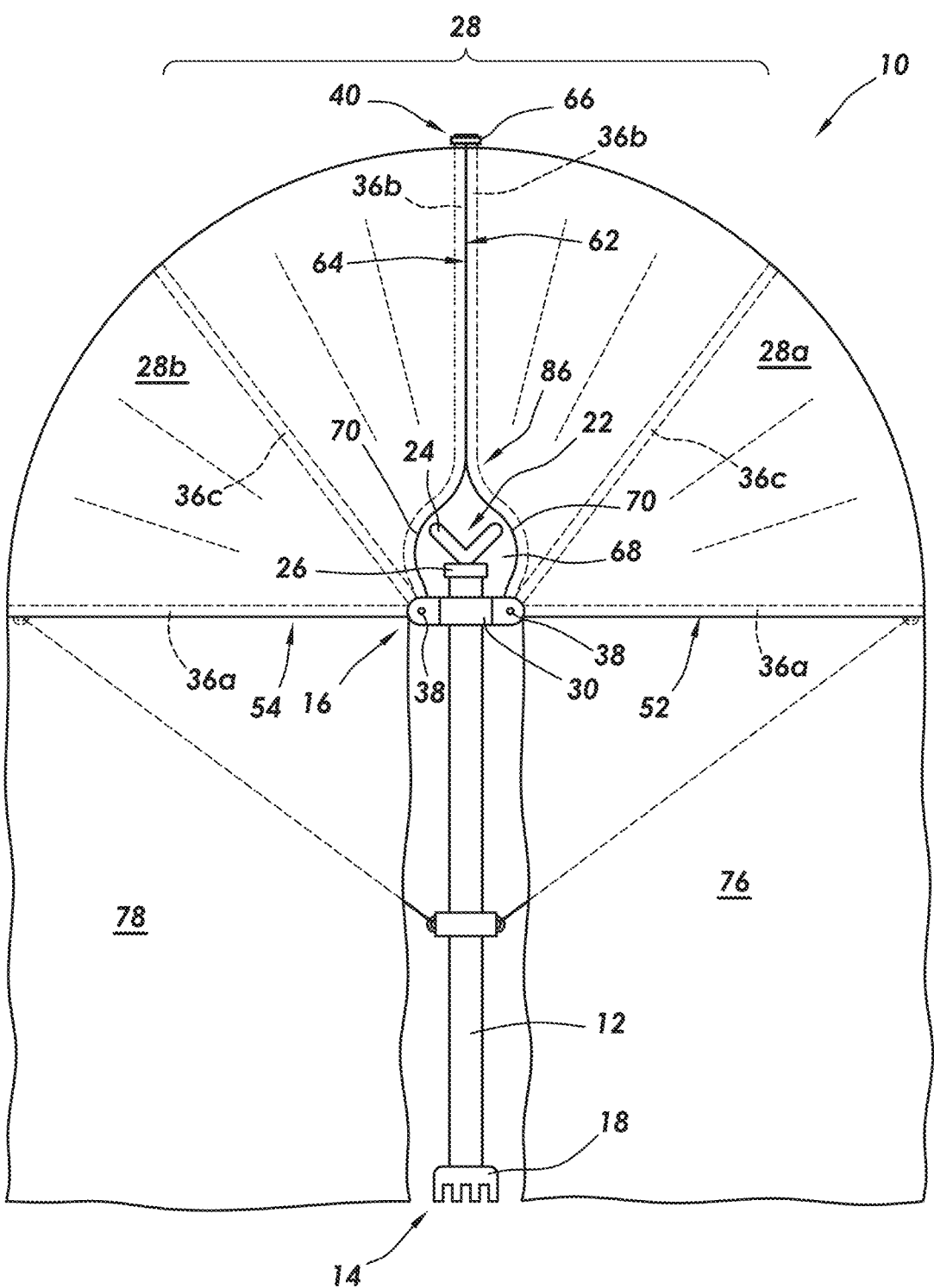
FIG. 3 shows a front elevation of the embodiment in FIG. 1.

FIGS. 1-3 illustrate an embodiment 10 of the present invention. The embodiment 10 comprises an elongated member 12 having a first end 14 and a second end 16 opposite the first end 14. In use, the first end 14 may rest on a ground surface (not shown) or be configured for attachment to an existing targeting apparatus support stand, as further discussed herein.

The elongated member is preferably a hollow, lightweight tubular member. It may be made of aluminum, carbon fiber, or other lightweight durable materials. It also may be configured in a variety of formats and/or lengths. The illustrated elongated member 12 is a single piece construction. However, alternative elongated members may be constructed from multiple lengths of material such as, for example, if the elongated member were a nested telescoping pole. Additionally, when the present invention is configured as a retrofit application for use with pre-existing support stands, the length of the elongated member is shorter than the illustrated embodiment 10 because the pre-existing support stand provides most of the height to reach a user's eye level.

The first end 14 of the illustrated embodiment 10 has a footing 18. In general, the footing 18 may be any structure that facilitates placement of the embodiment 10 on a ground surface (not shown). The footing may be configured in any number of shapes and/or made from any number of materials that promote stability. For example, footing 18 may be made from a durable elastomer, which helps protect the elongated member from the corrosive effects of water or other liquids on the ground surface and also increases friction where the footing 18 touches the ground surface.

Located at the second end 16 is a targeting apparatus rest 22. The rest 22 is any structure on which a targeting apparatus (not shown) may be securely placed and have its weight transferred to the elongated member 12. In the illustrated embodiment 10, the rest 22 has a V-shaped cradle 24. However, in alternative embodiments, the cradle may be shaped differently (e.g., U-shaped, Y-shaped, trapezoidal shaped, etc.) or the rest 22 may instead have a quick-release adapter that interfaces with the targeting apparatus and secures the targeting apparatus on the rest 22. Additionally, in alternative embodiments, the rest 22 may include a pivot connection or ball-and-socket joint (not shown) to allow movement of the targeting apparatus without removing it from the rest 22.

The illustrated rest 22 is static. It is attached to a cap 26 placed over the second end 16 of the elongated member 12. The illustrated rest 22 is also axially aligned with the elongated member 12 such that the vertex of the cradle 24 is coaxial with a centerline axis x through the elongated member 12 (see FIG. 1). However, the rest 22 may be offset in alternative embodiments as further discussed and illustrated herein.

A shielding screen 28 is mounted on the elongated member 12. The shielding screen 28 may be directly or indirectly attached to the elongated member 12. As such, the elongated member 12 supports the weight of the shielding screen 28 when the screen 28 is deployed for use.

As will be seen, the shielding screen 28 conceals a user from a targeted object. Preferably, it is made from a heavily diffused fabric material that is camouflage colored. However, other materials or other colors which serve to conceal the user are within the scope of the present invention.

As shown, in the embodiment 10 the shielding screen 28 is anchored to a primary ring 30 that extends around the elongated member 12, near the second end 16. The primary ring 30 preferably is statically fixed on the elongated member 12 such that the primary ring 30 does not rotate around the elongated member 12 and does not axially displace on the elongated member 12. The primary ring 30 may be affixed to the elongated member 12 during manufacturing prior to placement of the cap 26.

The shielding screen 28 may be configured in a variety of forms. As shown, the shielding screen 28 in the embodiment 10 is generally in the shape of a half circle. The screen 28 comprises a first side screen 28a extending from one side of the elongated member 12 and a second side screen 28b extending from an opposite side of the elongated member 12. The first and second screens 28a, 28b may be symmetric about the center axis x that extends axially though the elongated member 12, as shown in FIG. 1.

Referring to FIGS. 1-2, each of the side screens 28a, 28b is supported by one or more struts 36 that extend from a pivot point 38 on the primary ring 30. In general, the struts 36 extend from the pivot point 38 across the screen 28 to a distal end 40 of the struts 36 located at an outer perimeter edge 44 of the screen 28. The outer perimeter edge 44 may be affixed to the struts 36 near their distal end 40 through gluing, riveting, or some other method of affixment. Additionally, the struts 36 may extend through one or more sleeves 46 sewn to the screen material for added stability, as shown in FIG. 2. Preferably each side screen 28a, 28b has at least three struts 36: a bottom strut 36a, an inner side perimeter strut 36b, and an intermediate strut 36c.

In the embodiment 10, the primary ring 30 has a first set of tabs 48 extending laterally outward of one side of the elongated member 12 and a second set of tabs 50 extending laterally outward of an opposite side. These sets of tabs 48, 50 form yokes extending from the primary ring 30. As discussed below, pins within the yokes form the pivot point 38 that connects the struts 36 to the primary ring 30.

The bottom strut 36a forms a bottom perimeter edge 52 of the first side screen 28a and another bottom strut 36a forms a bottom perimeter edge 54 of the second side screen 28b. Each of these bottom struts 36a is held in a static position by cables 56 anchored to the elongated member 12. In the embodiment 10, the cables 56 are anchored to a secondary ring 58 around the elongated member 12. The secondary ring 58 is positioned on the elongated member 12 between the primary ring 30 and the first end 14 of the elongated member 12. The cables 56 extend from the secondary ring 58 to an eyelet 60 on the bottom strut 36a. Alternatively, the cables 56 may extend from an alternative anchor fixed to the elongated member 12 and/or the bottom strut 36a.

The secondary ring 58 is affixed on the elongated member 12 in such a manner so as to prevent axial displacement toward or away from either ends 14, 16 of the elongated member 12 once the shielding screen 28 is deployed. For example, the secondary ring 58 may be permanently affixed to the elongated member 12 through welding or other permanent affixation methods. Alternatively, the secondary ring 58 may be configured such that its positioning on the elongated member 12 can be changed and then tightened for deployment of the screen 28. For example, a threaded camming connection such as those employed in pool equipment, a snap collar, or other suitable structures may be used.

As best shown in FIG. 3, the inner side perimeter strut 36b forms the inner side perimeters of the first and second side screens 28a, 28b. One inner side perimeter strut 36b defines an inner side perimeter edge 62 of the first side screen 28a and another inner side perimeter strut 36b defines an inner side perimeter edge 64 of the second side screen 28b. A locking mechanism holds the perimeter edge 62 of the first side screen 28a adjacent to the side perimeter edge 64 of the second side screen 28b. For example, in the embodiment 10 a retaining ring 66 positioned around the distal end 40 of the inner side perimeter struts 36b holds the side perimeter edges 62, 64 adjacent to each other.

Proceeding from the respective distal ends 40 of the inner side perimeter struts 36b toward the pivot point 38, the side perimeter edges 62, 64 are adjacent each other until the perimeter edges 62, 64 diverge from one another at a divergement location 86 where an opening 68 begins to form. A portion 70 of the inner side perimeter strut 36b defines the opening 68. The portion 70 in the embodiment 10 is curved and extends around the targeting apparatus rest 22 until the struts 36b reach the pivot point 38 where they are connected to the primary ring 30.

The intermediate strut 36c provides further structural support for the shielding screen 28. It is located between the bottom strut 36a and the inner side perimeter strut 36b. The intermediate strut 36c may extend through one or more sleeves 46 that are sewn to the screen material, as shown in FIG. 2. When present, the one or more sleeves 46 help hold the shielding screen 28 on the strut 36c.

The struts are preferably made of a lightweight durable material such as aluminum, carbon fiber, polymer plastic or the like. The struts 36 are attached to the screen 28 such that when the struts 36 are pivoted about the pivot point 38 the screen follows. The bottom strut 36a and the inner side perimeter strut 36b may be sewn into a sleeve (not shown) that extends along most of the respective perimeter edges 52, 54, 62, 64 they form. Alternatively, the screen 28 may be glued, riveted, or affixed to the struts 36 in some other manner. In any case, the screen 28 is preferably not affixed to the intermediate strut 36c and bottom strut 36a near the pivot point 38 to allow freer movement of those struts 36 a, 36c around the pivot point 38.

In the embodiment 10, the pivot point 38 allows for easy transport to a desired location for targeting activities and deployment of the shielding screen 28 once at the desired location. While transporting the embodiment 10 to the desired location, the struts 36 are rotated about the pivot point 38 to a position alongside the elongated member 12, generally parallel to the elongated member 12. Once at the desired location, the struts 36 are rotated about the pivot point 38 away from the elongated member 12, with the inner side perimeter strut 38b leading the way. Each inner side perimeter strut 36b is rotated from its transport position alongside the elongated member 12 approximately 180° to its final deployment position, where the inner side perimeter edges 62, 64 are adjacent each other. Once the inner side perimeter strut 36b is in its final deployment position, the retaining ring 66 may be installed around the distal end 40 of each inner side perimeter strut 36b to hold the inner side perimeter edges 62, 64 in place adjacent to each other. In some embodiments, the retaining ring 40 may be hinged to one inner side perimeter strut 36b and extend around the other side perimeter strut 36b. In other embodiments, a clip (not show) or other retaining member may be used in place of the retaining ring 66.

The intermediate strut 36c and the bottom strut 36a follow the lead of the inner side perimeter strut 36b because the screen 28 pulls them. With the secondary ring 58 affixed to the elongated member 12, the bottom strut 36a will eventually reach a final deployment position where it can no longer be rotated due to the cables 56 extending between the bottom strut 36a and the secondary ring 58. In the embodiment 10, such final deployment position is reached when the bottom strut 36a has been rotated approximately 90° from its transport position alongside the elongated member 12. The intermediate strut 36c will also reach its final deployment position when the bottom strut 36a reaches its final deployment position.

The screen 28 is preferably sized such that it is taut against the struts 36 when the screen 28 is fully deployed and the struts 36 reach their final deployment position. In this regard, a user should have to exert some force to pull the inner side perimeter edges 62, 64 together. Additionally, the screen 28 should be at least large enough to conceal the user from the targeted object. For example, a semicircular screen 28 having an eighteen-inch radius should suffice.

One or more curtains may also extend from the shielding screen 28 toward the ground surface to aid in concealment of the user. In the embodiment 10, a first curtain 76 extends from the bottom perimeter edge 52 of the first side screen 28a and a second curtain 78 extends from the bottom perimeter edge 54 of the second side screen 28b. The curtains 76, 78 may be made from pieces of material separate of the screen 28 material, in which case the curtains 76, 78 would be glued, riveted, or affixed to the bottom strut 36a in some other manner. Alternatively, the curtains 76, 78 may merely be an extension of the screen 28 material. For example, the first curtain 76 may be an extension of the material for the first side screen 28a and the second curtain 78 may be an extension of the material for the second side screen 28b.

Figure 4:
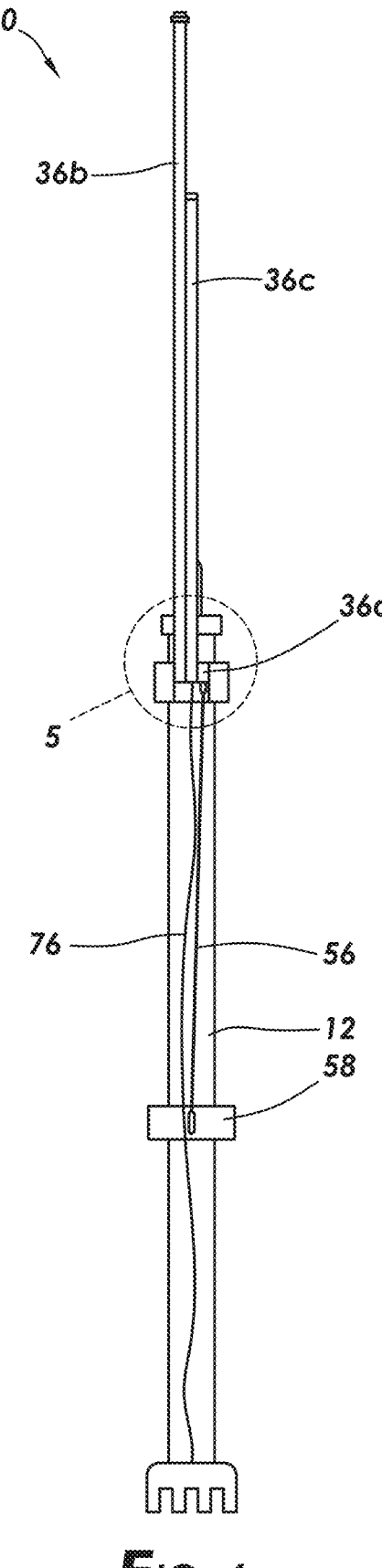
FIG. 4 shows a right side elevation view of the embodiment in FIG. 1.
Figure 5:
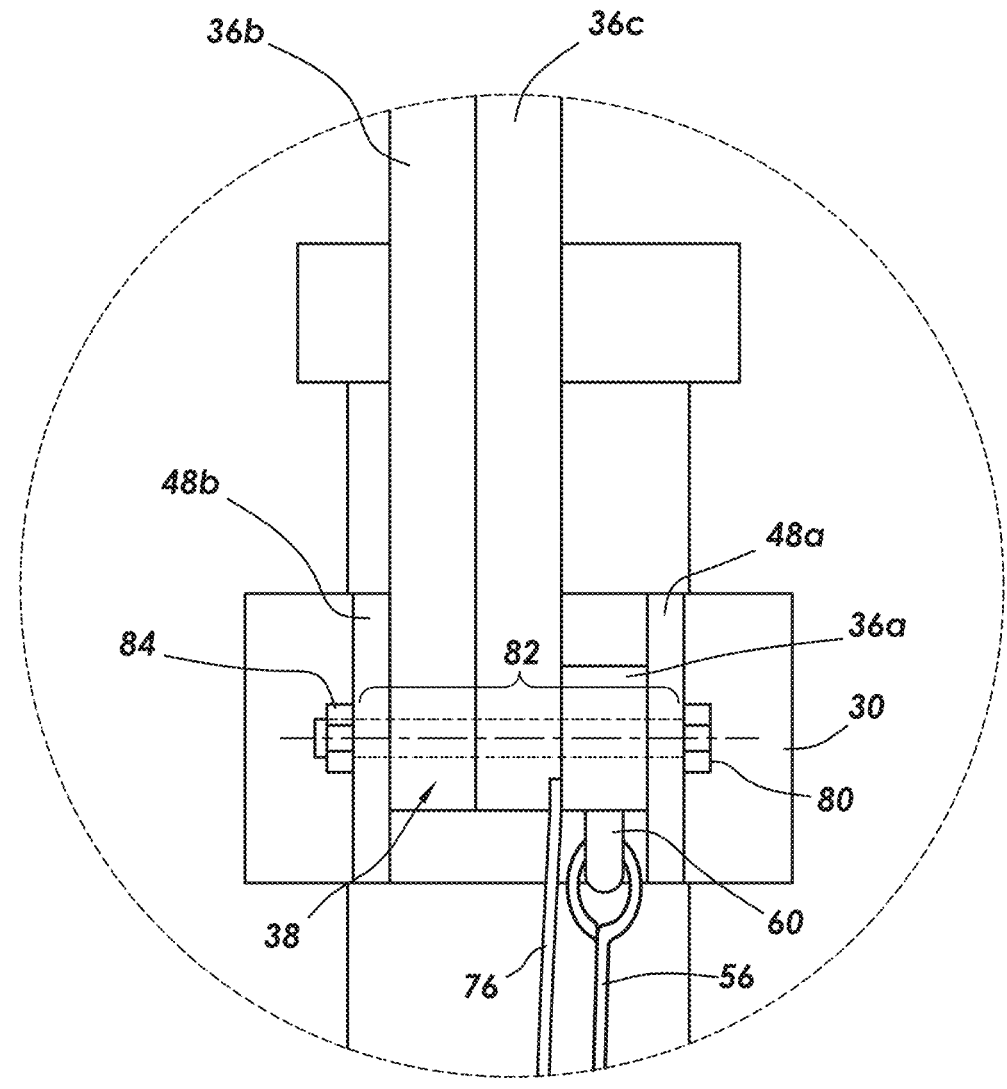
FIG. 5 is a close-up view taken from FIG. 4

FIGS. 4 and 5 illustrate a right side elevation view of the embodiment 10, but with the shielding screen 28 removed for illustration purposes. As between the struts 36, the inner side perimeter strut 36b is at front of the embodiment 10, the intermediate strut 36c is in the middle, and the bottom strut 36a is in the rear. As shown in FIG. 5, a bolt 80 forms the pivot point 38 on the primary ring 30. The bolt 80 extends through aligned boreholes 82 in (a) the first tab 48a (from the first set of tabs 48), (b) the bottom strut 36a, (c) the intermediate strut 36c, (d) the inner side perimeter strut 36b, and (e) a second tab 48b (from the first set of tabs 48). A nut 84 secures the bolt 80 in place. It should be noted, however, that other structures creating a pivot (e.g., cotter pins, hinges, rivets, etc.) may suffice.

Also shown in FIGS. 4 and 5 is the first curtain 76 extending from the bottom strut 36a. The first curtain 76 is slightly in front of the cable 56 that extends from the secondary ring 58 on the elongated member 12 and the eyelet 60 where the cable 56 connects to the bottom strut 36a.

Figure 6A:
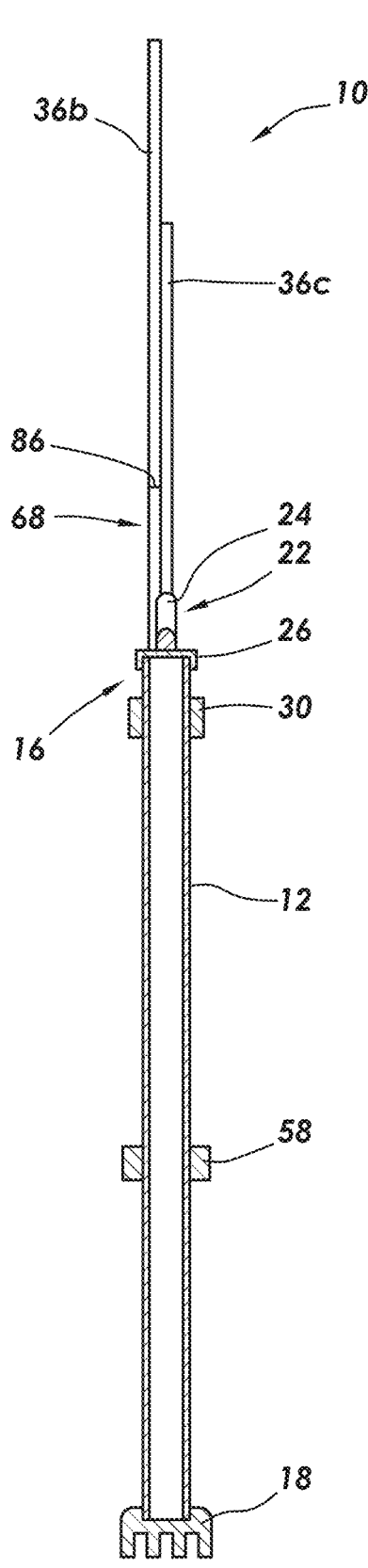
FIG. 6A is a cross section view taken along a plane bisecting the embodiment at cross section line 6-6 in FIG. 2.

FIG. 6A is a cross section view taken cross section line 6-6 in FIG. 2, but with the second curtain 78 and the second side screen 28a removed for illustration purposes. The inner side perimeter strut 36b is in front of the intermediate strut 36c. The opening 68 that is partially defined by the inner side perimeter strut 36b begins at the divergence location 86. As shown, in the embodiment 10 the targeting apparatus rest 22 is axially aligned with the elongated member 12 and, thus, the vertex of the cradle 24 is generally adjacent the opening 68.

FIG. 6A also shows the cap 26 of the rest 22 on the second end 16 of the elongated member 12. The primary ring 30 and the secondary ring 58 are both positioned around the elongated member 12 below the cap 26. Finally, the footing 18 is positioned on the first end 14 of the elongated member 12.

Figure 6B:
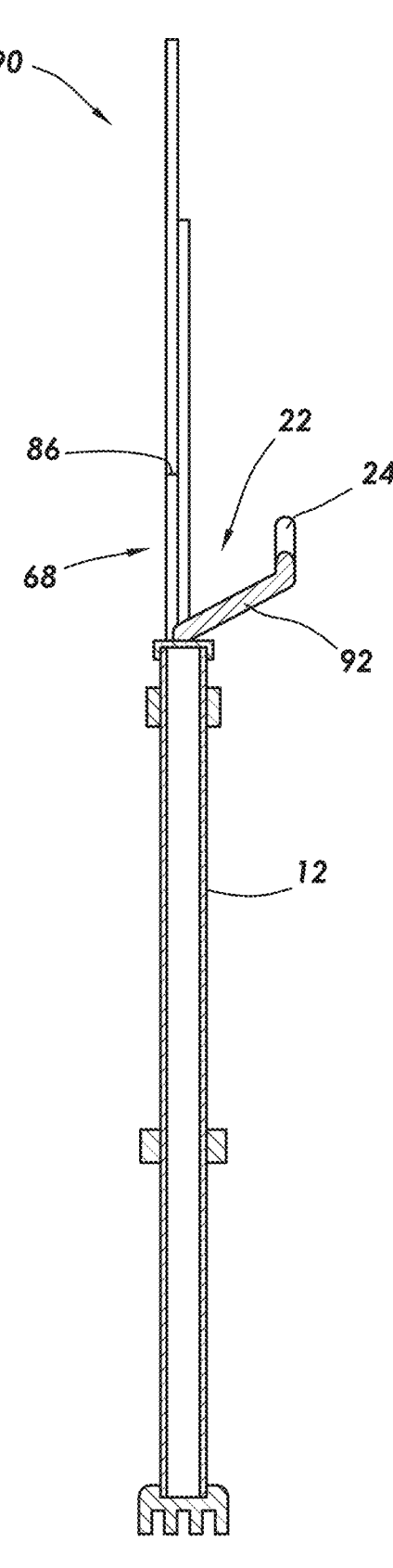
FIG. 6B is a cross section view taken along a plane bisecting an alternative embodiment.

FIG. 6B shows a cross section view taken along a plane bisecting an alternative embodiment 90. The alternative embodiment 90 is the same as the embodiment 10 shown in FIG. 6A except that the targeting apparatus rest 22 is not axially aligned with the elongated member 12. Instead, the rest 22 extends through an offset portion 92 prior to terminating at the cradle 24. As such, in this alternative embodiment 90 the cradle 24 is not generally adjacent the opening 68 that starts at the divergence location 86.

Figures 7A, 7B:
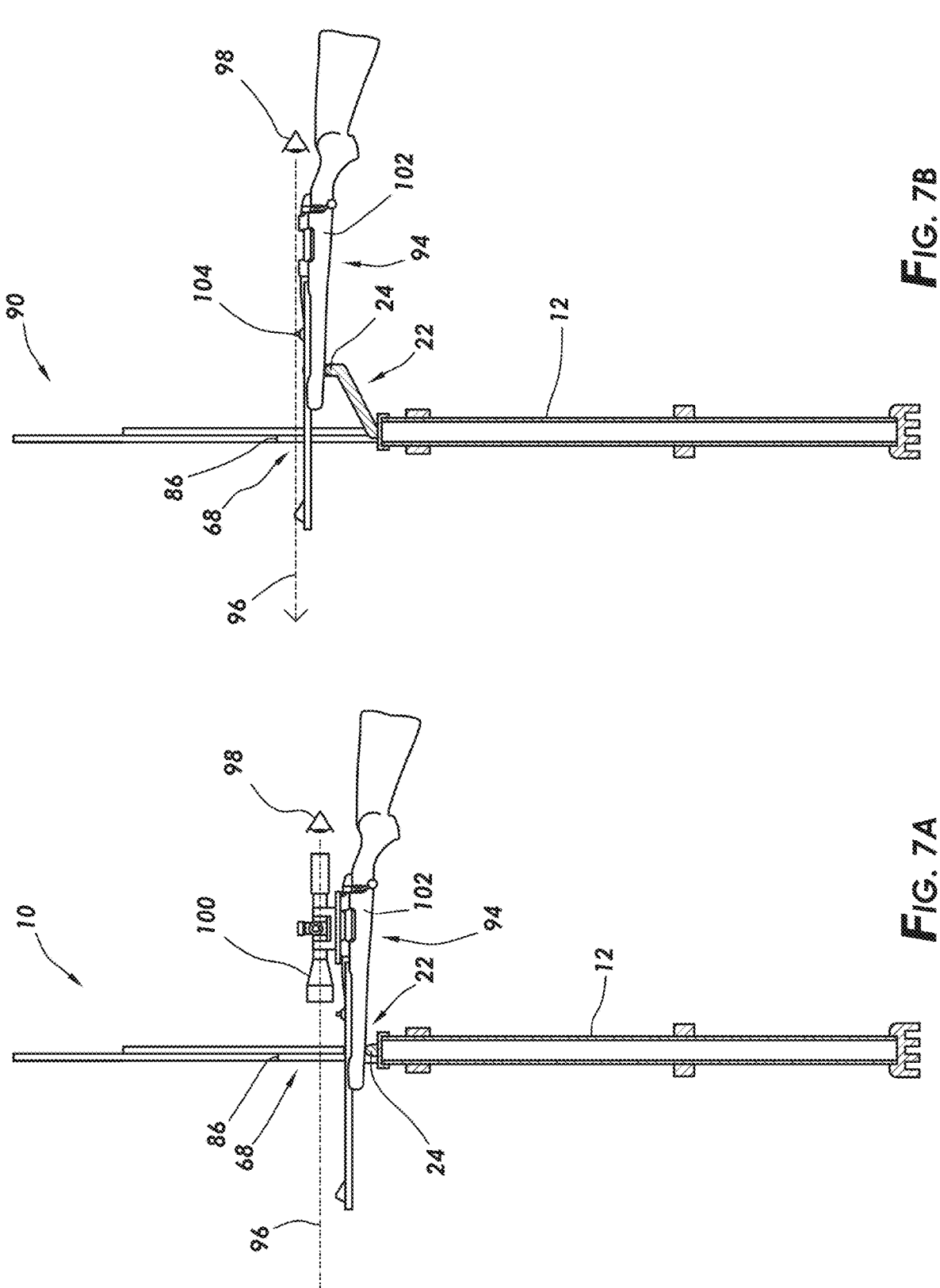
FIG. 7A illustrates the cross section view in FIG. 6A with the embodiment supporting a targeting apparatus in the form of a firearm having a scope and a line of sight through the scope.
FIG. 7B illustrates the cross section view in FIG. 6B with the alternative embodiment supporting a targeting apparatus in the form of a firearm having iron sights and a line of sight through the iron sights.
Figure 7D:
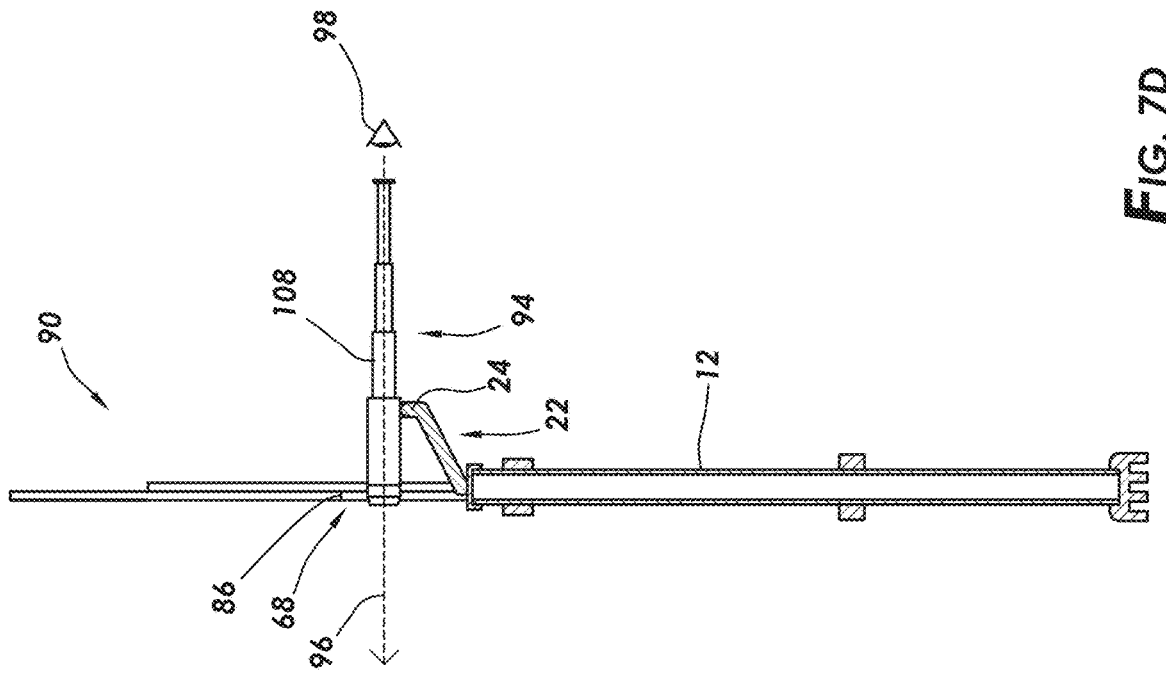
FIG. 7D illustrates the cross section view in FIG. 6B with the embodiment supporting a targeting apparatus in the form of a monocular telescope and a line of sight through the telescope.
Figure 7C:
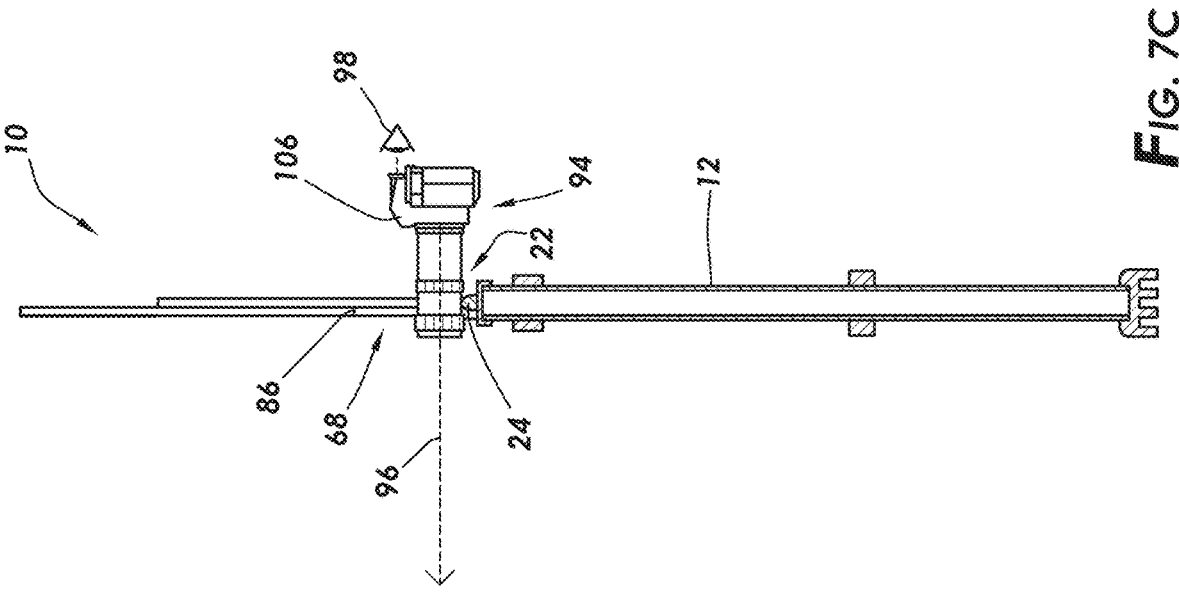
FIG. 7C illustrates the cross section view in FIG. 6A with the embodiment supporting a targeting apparatus in the form of a camera having a lens and a line of sight through the camera and its lens.

FIGS. 7A-7D show the present invention in cross section with various forms of a targeting apparatus 94 being used. FIGS. 7A and 7C show the embodiment 10 from FIG. 6A, while FIGS. 7B and 7D show the alternative embodiment 90 from FIG. 6B.

In all of FIGS. 7A-7D, a line of sight 96 extends from a user's eye 98, through the targeting apparatus 94, and through the opening 68 that starts at the divergence location 86.

In FIG. 7A, the line of sight 96 extends from the user's eye 98 through a scope 100 mounted on a firearm 102. Because the targeting apparatus rest 22 is axially aligned with the elongated member 12, the firearm 102 contacts the cradle 24 at a location generally adjacent the opening 68.

In FIG. 7B, the line of sight 96 extends from the user's eye 98 through iron sights 104 mounted on the firearm 102. Because the targeting apparatus rest 22 is not axially aligned with the elongated member 12, the firearm 102 contacts the cradle 24 at a location that is not generally adjacent the opening 68.

In FIG. 7C, the line of sight 96 extends from the user's eye 98 through a camera 106. Although the line of sight 96 changes direction inside the camera 106, it exits the camera 106 through the camera lens and through the opening 68. Because the targeting apparatus rest 22 is axially aligned with the elongated member 12, the lens of the camera 106 contacts the cradle 24 at a location generally adjacent the opening 68.

In FIG. 7D, the line of sight 96 extends from the user's eye 98 through a monocular telescope 108. Because the targeting apparatus rest 22 is not axially aligned with the elongated member 12, the telescope 108 contacts the cradle 24 at a location that is not generally adjacent the opening 68.

Figure 8:
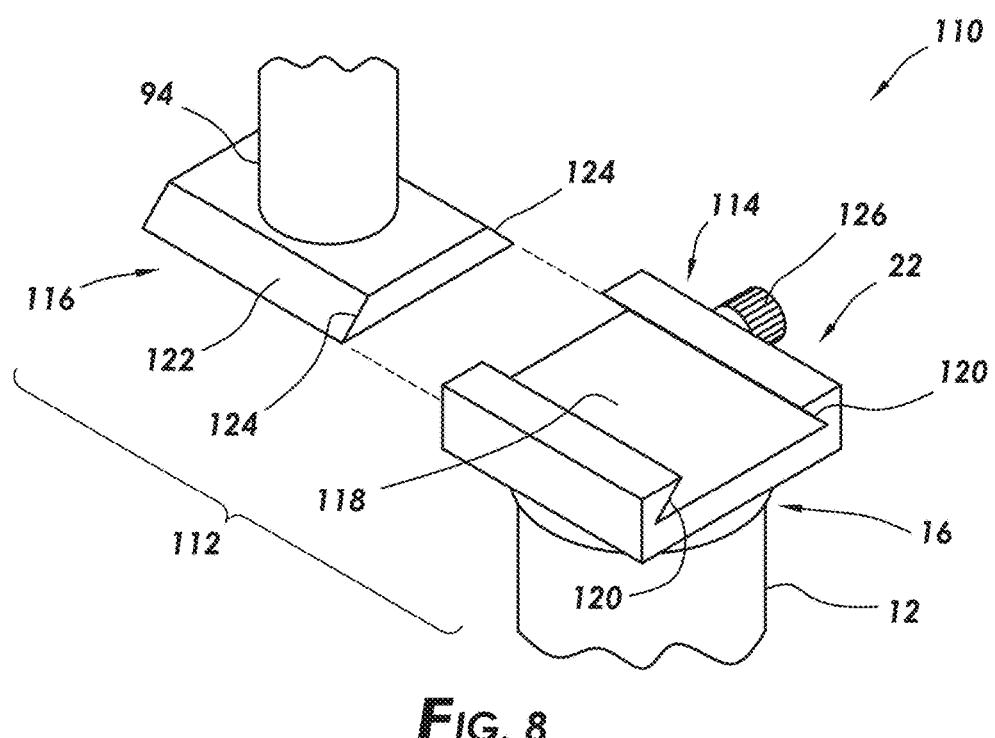
FIG. 8 is a perspective view of an example of a quick-release adapter that may be optionally included in an embodiment of the invention.

FIG. 8 shows an alternative embodiment 110 of the targeting apparatus rest 22. In this alternative embodiment 110, the targeting apparatus rest 22 is in the form of a quick-release adapter 112. There are many types of quick-release adapters available. In this embodiment 110, the adapter 112 comprises a receiver 114 and a connector 116. The receiver 114 is mounted on the second end 16 of the elongated member 12 and the connector 116 is mounted on the targeting apparatus 94. The receiver 114 has a receptacle 118 with angled sidewalls 120. The connector 116 has a protrusion 122 with coordinating angled sidewalls 124. In use, the protrusion 122 is placed within the receptacle 118. The receptacle 118 is closed around the protrusion 122 such that the angled sidewalls 120 of the receptacle 118 are adjacent the coordinating angled sidewalls 124 of the protrusion 122. A set screw 126 or alternative camming action tightens the connection, thereby locking the targeting apparatus 94 to the rest 22.

A quick-release adapter could also be used to retrofit existing support stands with the present invention. In this regard, the connector 116 could be positioned on the first end 14 of the elongated member 12 so that the present invention connects to a receiver on an existing support stand (not shown). In such applications, the elongated member would be sized so as not to provide substantial height, since the existing support stand would provide most of the height.

Figures 9A, 9B:
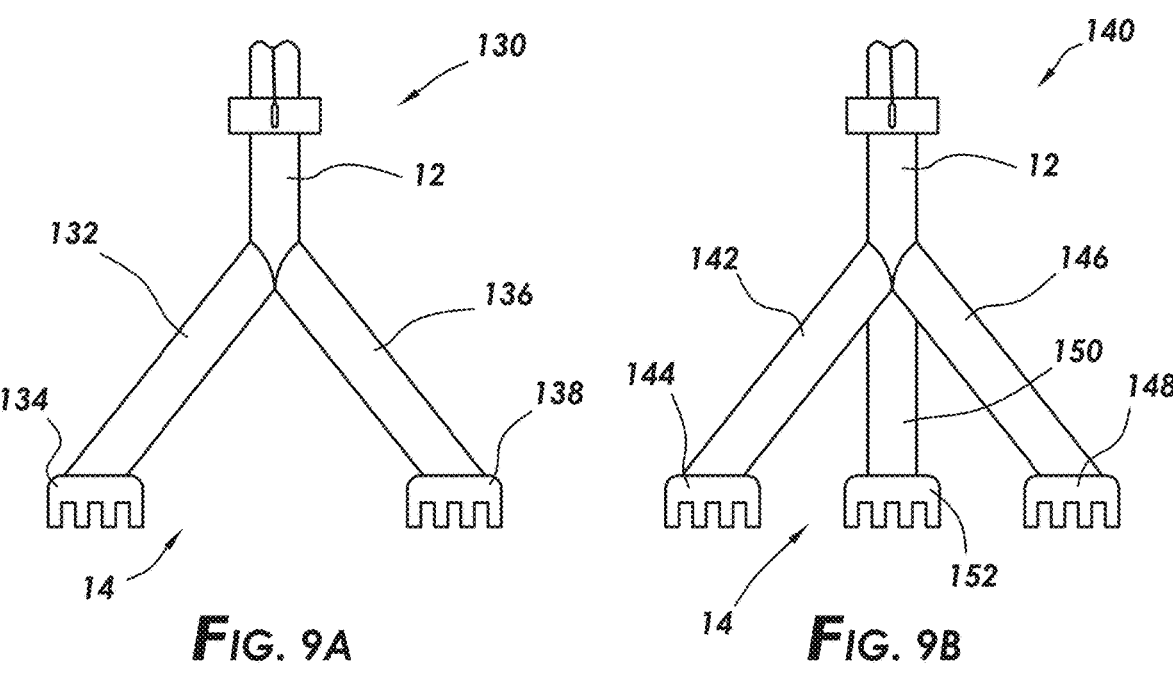
FIG. 9A is a partial elevation view of an alternative first end of the embodiment.
FIG. 9B is a partial elevation view of another alternative first end of the embodiment.

FIG. 9A shows a further alternative embodiment 130 of the first end 14 of the elongated member 12. In this embodiment 130, the first end 14 is configured as a bipod comprising a first leg 132 with a first footing 134 attached thereto and a second leg 136 with a second footing 138 attached thereto. Such a configuration allows for two points of contact with the ground surface.

FIG. 9B shows yet another alternative embodiment 140 of the first end 14 of the elongated member 12. In this embodiment 140, the first end 14 is configured as a tripod comprising a first leg 142 with a first footing 144 attached thereto, a second leg 146 with a second footing 148 attached thereto, and a third leg 150 with a third footing 152 attached thereto. Such a configuration allows for three points of contact with the ground surface, thereby providing optimal stability.

Figure 10:
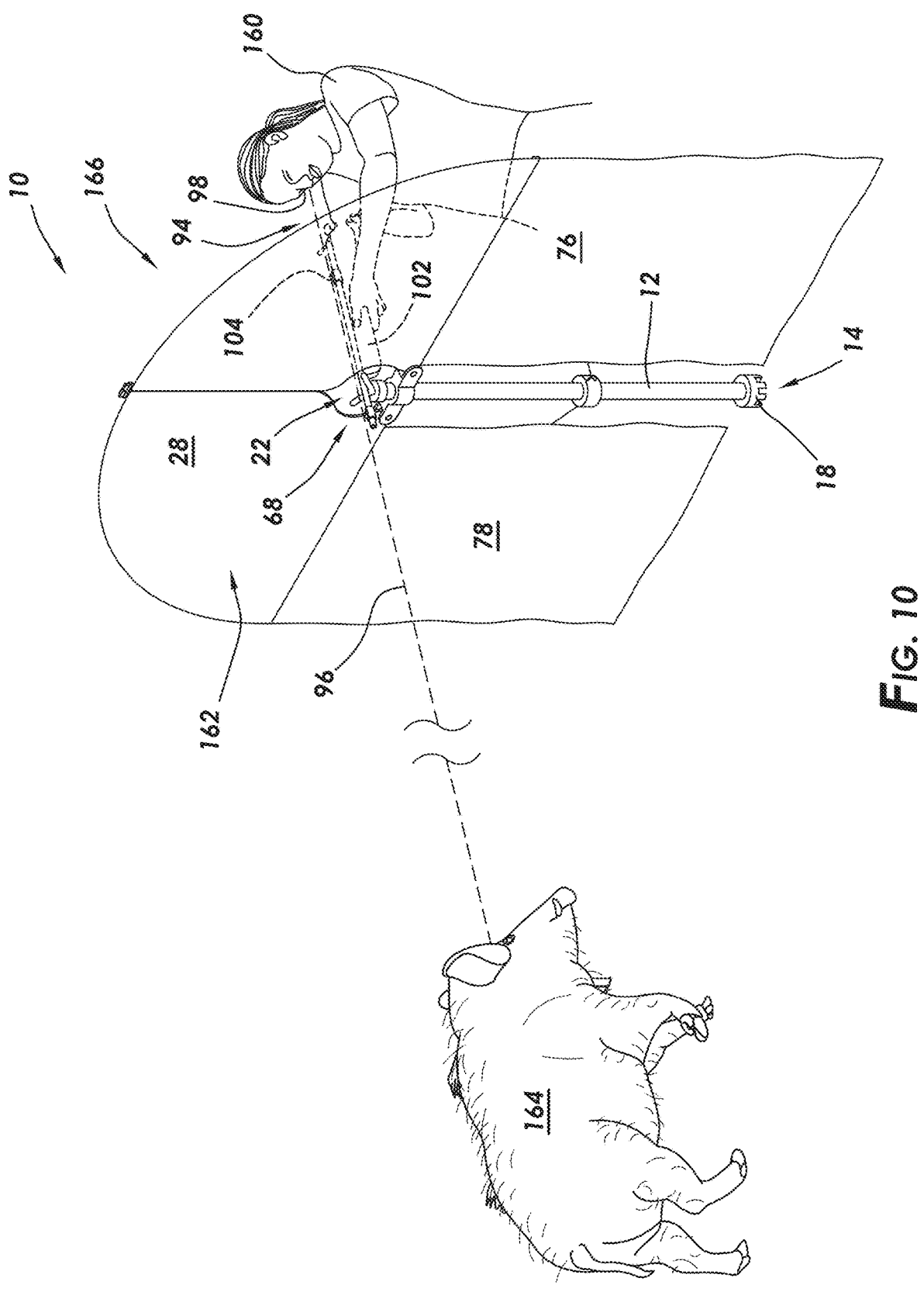
FIG. 10 is a front perspective view of the embodiment in use, with the targeting apparatus being a firearm having iron sights and a wild boar being the targeted object.

FIG. 10 shows the embodiment 10 in operation. As shown, a user 160 has placed the footing 18 at the first end 14 of the elongated member 12 on the ground surface. A target-facing side 162 of the screen 28 faces the targeted object, which, in this case, is a wild boar 164. Opposite the target-facing side 162 is a user-facing side 166 that faces the user 160. The user 160 is positioned behind the shielding screen 28 and the curtains 76, 78, thereby concealing herself from the wild boar 164. The user 160 has placed her targeting apparatus 94 in the targeting apparatus rest 22. In this case, the targeting apparatus 94 is a firearm 102 with iron sights 104. The line of sight 96 extends from the user's eye 98, along the iron sights 104, through the opening 68, to the wild boar 164. The only thing visible to the wild boar 164 through the opening 68 is the barrel of the firearm 102 and the targeting apparatus rest 22. The wild boar 164 cannot see the user 160 and, therefore, the user has increased her odds of successfully targeting the targeted object.

The present invention is described in terms of one or more specifically described embodiments which is/are presented for purposes of illustration and not of limitation. Those skilled in the art will recognize that alternative embodiments not specifically described herein can be used in carrying out the present invention. Other aspects and advantages of the present invention may be obtained from a study of this disclosure and the drawings, along with the appended claims.

I claim:

1. A stand for supporting a targeting apparatus with a line of sight for targeting an object comprising:
    an elongated member having first end and a second end opposite said first end;
    a targeting apparatus rest at the second end;
    a shielding screen mounted on the elongated member, said shielding screen having an opening, said shielding screen comprising:
        a first side screen on a first side of the elongated member;
        a second side screen on a second side of the elongated member
    at least one strut supporting the first side screen, said at least one strut supporting the first side screen having a first end pivotably mounted on the elongated member; and
    at least one strut supporting the second side screen, said at least one strut supporting the second side screen having a first end pivotably mounted on the elongated member; and
wherein the opening is positioned for the line of sight to extend through when the targeting apparatus is placed on the targeting apparatus rest to target the object.

2. The stand of claim 1 wherein the targeting apparatus rest is axially aligned with the elongated member.

3. The stand of claim 1 wherein the targeting apparatus rest is offset from the opening.

4. The stand of claim 1 wherein the targeting apparatus rest is visible through the opening from a vantage point in front of the stand.

5. The stand of claim 1 wherein the shielding screen is shaped as a semicircle.

6. The stand of claim 1 wherein the targeting apparatus rest comprises a first member and a second member adjoined to form a cradle.

7. The stand of claim 6 wherein the cradle is V-shaped.

8. The stand of claim 1 wherein the first side screen and the second side screen are symmetric about an axis through the elongated member.

9. The stand of claim 8 wherein the first side screen and the second side screen each comprise a first perimeter edge and each of said first perimeter edges at least partially define the opening.

10. The stand of claim 9 wherein the first side screen and the second side screen each comprise a second perimeter edge intersecting the first perimeter edge to form a corner, and wherein the corner of the first side screen is attachable to the corner of the second side screen.

11. The stand of claim 1 wherein the first end of each strut is attached to a first ring that extends around the elongated member.

12. The stand of claim 1 wherein the at least one strut supporting the first side screen comprises a plurality of struts and the at least one strut supporting the second side screen comprises a plurality of struts.

13. The stand of claim 12 wherein one of the struts supporting the first side screen forms a bottom perimeter edge of the first side screen and one of the struts supporting the second side screen forms a bottom perimeter edge of the second side screen.

14. The stand of claim 13 wherein each of the struts that form the bottom perimeter edges is anchored to elongated member between the first end and the second end.

15. The stand of claim 14 wherein each of the struts that form the bottom perimeter edges is anchored to a second ring that extends around the elongated member.

16. The stand of claim 1 further comprising at least one curtain extending from the shielding screen toward the first end of the elongated member.

17. The stand of claim 16 wherein the first side screen has a bottom perimeter edge and the second side screen has a bottom perimeter edge, and wherein at least one curtain extends from the bottom perimeter edge of the first side screen and at least one curtain extends from the bottom perimeter edge of the second side screen.

18. The stand of claim 17 wherein the at least one curtain extending from the bottom perimeter edge of the first side screen is a single sheet of diffuse material and the at least one curtain extending from the bottom perimeter edge of the second side screen is a single sheet of diffuse material.

19. The stand of claim 1 wherein the targeting apparatus rest is selected from the group consisting of a gun rest, a camera rest, a binoculars rest, a telescope rest, and a laser rest.

20. A stand for supporting a targeting apparatus with a line of sight for targeting an object comprising:
    an elongated member having first end and a second end opposite said first end;
    a targeting apparatus rest at the second end;
    a shielding screen mounted on the elongated member, said shielding screen having an opening, said shielding screen comprising:
        a first side screen on a first side of the elongated member;
        a second side screen on a second side of the elongated member, said second side screen being symmetric with the first side screen about an axis through the elongated member;
        the first side screen and the second side screen each comprising a first perimeter edge and each of said first perimeter edges at least partially defining the opening;
        the first side screen and the second side screen each comprising a second perimeter edge intersecting the first perimeter edge to form a corner, and wherein the corner of the first side screen is attachable to the corner of the second side screen; and
wherein the opening is positioned for the line of sight to extend through when the targeting apparatus is placed on the targeting apparatus rest to target the object.

21. The stand of claim 20 wherein the targeting apparatus rest is axially aligned with the elongated member.

22. The stand of claim 20 wherein the targeting apparatus rest is offset from the opening.

23. The stand of claim 20 wherein the targeting apparatus rest comprises a first member and a second member adjoined to form a cradle.

24. The stand of claim 20 further comprising at least one curtain extending from the shielding screen toward the first end of the elongated member.

25. The stand of claim 24 wherein first side screen has a bottom perimeter edge and the second side screen has a bottom perimeter edge, and wherein at least one curtain extends from the bottom perimeter edge of the first side screen and at least one curtain extends from the bottom perimeter edge of the second side screen.

26. The stand of claim 20 wherein the targeting apparatus rest is selected from the group consisting of a gun rest, a camera rest, a binoculars rest, a telescope rest, and a laser rest.

\* \* \* \* \*